United States Patent [19]

Cushing

[11] 3,831,311
[45] Aug. 27, 1974

[54] APPARATUS FOR USE IN HAULING TRAPS AND THE LIKE

[76] Inventor: Lloyd C. Cushing, 5 Chester Ave., Falmouth, Maine 04105

[22] Filed: Dec. 13, 1972

[21] Appl. No.: 314,592

[52] U.S. Cl. .............................................. 43/6.5
[51] Int. Cl. ........................................ A01k 81/04
[58] Field of Search ........................... 43/6.5, 8, 15

[56] References Cited
UNITED STATES PATENTS
3,710,499  1/1973  Tandano ............................ 43/6.5
3,722,126  3/1973  Whipple ............................ 43/6.5

*Primary Examiner*—G. E. McNeill

[57] ABSTRACT

Apparatus is disclosed for use in hauling lobster traps and includes a platform mounted in the ship between a trap line hauler and the side of the ship over which the traps are to be lifted. The platform has fore and aft sections spaced to provide a pathway for a pivoted lifting arm swung by a ram between first and second positions. The arm has a sheave over which the trap line is trained. In the first position of the arm, the sheave is outboard so that a trap hauled to the surface is lifted over the side as the ram swings the arm towards its second position as the line is pulled by the hauler until the trap is deposited on the platform. In the second position of the arm, it is below the platform and the trap is free of its sheave. The platform is a ramp downwardly inclined so that a freed trap can slide or be easily moved to a service station located aft of the apparatus.

11 Claims, 7 Drawing Figures

PATENTED AUG 27 1974 3,831,311

APPARATUS FOR USE IN HAULING TRAPS AND THE LIKE

BACKGROUND OF THE INVENTION

Such crustacians as lobsters are caught in traps that are weighted in order that they will sink to the bottom. Because of their weight, trap hauling is hard work. As a consequence, trap haulers are widely used but their use, while greatly reducing the manual effort, still requires that the traps, once hauled to the surface, be manually lifted over the side of the boat. Not only is the fisherman then in an awkward position but also he is in some danger of falling overboard particularly when the sea is rough. Both the labor and the risk involved are more serious problems when fishing far offshore with long lines with many traps secured thereto by spaced attaching lines.

THE PRESENT INVENTION

The general objective of the present invention is to provide apparatus operable to lift inboard a trap being hauled and deposit it on a platform.

In accordance with the invention, this objective is attained with apparatus that includes a platform extending from the position within the ship from which the trap line is pulled into the side of the boat over which a hauled trap is to be lifted. The platform includes fore and aft sections spaced apart to establish an athwartship pathway that is narrower than the traps. A lifting arm is pivotally mounted below the platform to swing lengthwise thereof between first and second positions and is provided at its free end with a sheave over which the line to be hauled is trained. Power operated means located below the platform and connected to the lifting arm is operable to swing it between its two positions. In the first arm position, the sheave is located outboard and in its second position, the arm is adjacent the line hauling position so that the trap, as it is pulled in, is lifted over the rail and deposited on the platform.

Another objective of the invention is to provide that, in the second position of the arm, it is below the platform and the trap line is free of its sheave.

Another objective of the invention is to provide that the platform of such apparatus is in the form of a ramp that is inclined upwardly and inwardly and also downwardly towards the stern so that a trap on the ramp, once freed from the arm, is free to slide or be slid along the ramp towards the stern.

Yet another objective of the invention is to provide such apparatus for use where there are a substantial number of traps, each having an attaching line connected to a corner thereof and to the main line with the attaching lines spaced lengthwise thereof. The uppermost part of the ramp is sufficiently close to the upper edge of the sheave of a trap hauler that the attaching lines do not become caught thereby in order that each trap on the ramp, once free of the lifting arm, is in a position in which it is free to slide therefrom to a station where it can be serviced or from which it can be easily slid if it fails to move therefrom on its own accord.

BRIEF DESCRIPTION OF THE DRAWINGS

In the accompanying drawings, a trap hauler in accordance with the invention is shown as installed in a boat

THE PREFERRED EMBODIMENT OF THE INVENTION

Figure 1:
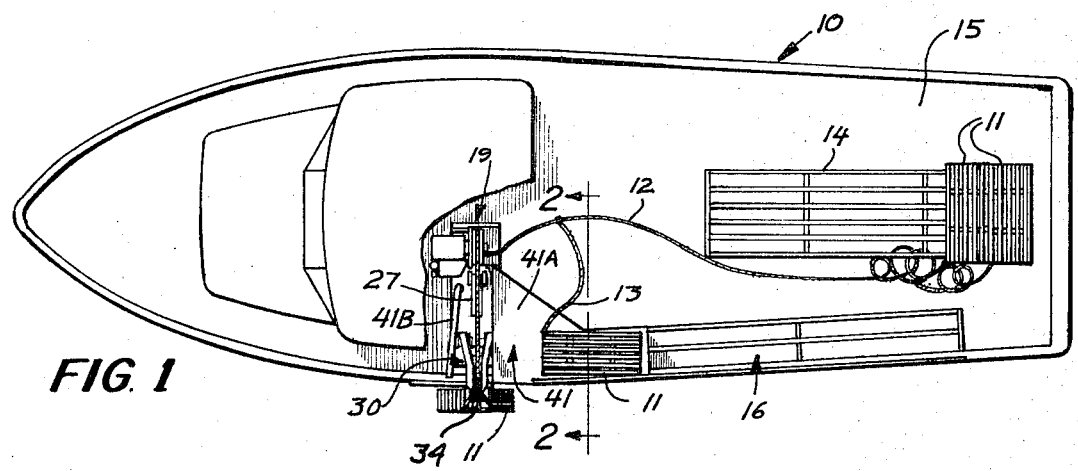
FIG. 1 is a plan view thereof.

In the drawings, a boat, generally indicated at 10, is shown as equipped in accordance with the invention for that type of lobster fishing using a substantial number of lobster traps 11, shown as of a conventional type, connected to a main line 12 in spaced relationship by attaching lines 13. Typically, the attaching lines 13 are spaced about 60 feet apart and are, themselves, about 6 feet in length and each is tied to a corner of a trap 11 as may best be seen in FIG. 5.

In this type of fishing, a platform 14, see FIG. 1, is mounted on the deck 15 of the boat 10 centrally thereof for the support of the baited traps and the platform extends aft so the traps 11 may be dropped over the stern as the boat 10 crosses a selected fishing area. The boat is also provided with a rack 16 extending along the side over which the traps 11 are to be pulled inboard from a position forwardly thereof where a member 17 mounted on that side protects the ship's rail 18 from being damaged during trap hauling, see FIG. 3. The rack 16 receives a hauled trap 11 and before that trap is transferred to the platform 14, any lobsters are removed and it is rebaited and otherwise readied for re-use.

Figure 7:
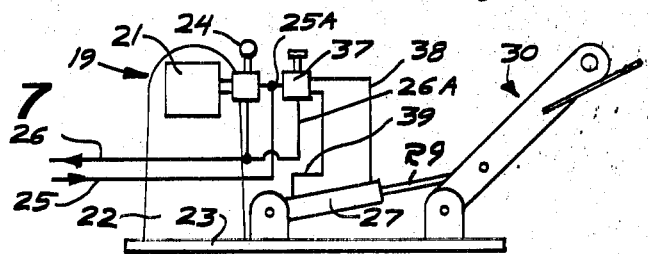
FIG. 7 is a schematic view of the fluid pressure system for operating the hauling sheave and the ram in control of the lifting arm.

While single traps are still often manually hauled, trap haulers are in general use and one is generally indicated at 19. Such a hauler consists of a sheave 20 driven by a reversible hydraulic motor 21 and mounted on a support 22 secured to a bed plate 23 anchored to the deck 15. A stud 22A is disposed adjacent the sheave 20 to prevent the line 12 from becoming wound about the sheave while ensuring an adequate grip on the line. As such haulers are conventional, the hauler 19 is not further detailed other than to point out that it has a control 24 having neutral, forward and reverse positions. In FIG. 7 the supply and return lines of the hydraulic system to the motor 21 are indicated at 25 and 26, respectively.

In accordance with the invention, the cylinder 27 of a double-acting hydraulic ram has a pivotal connection 28 with the plate 23 close to the hauler 19 with its stem 29 pivotally connected to the lifting arm generally indicated at 30. As may best be seen in FIG. 3, the lifting arm 30 consists of two side members 31 each having a pivotal connection 32 with a mount 33 on the plate 23 so that the arm is free to swing between outboard and inboard positions in a plane inclusive of the groove of the sheave 20. The inner ends of the members 31 are inclined inwardly towards each other and their outer ends are parallel and interconnected by spacers 32. A sheave 34 that is wider than the hauling sheave 20 is rotatably supported by the members 31 at their free ends. The ram stem 29 has a pivotal connection 35 with a cross rod 36 carried by the inclined ends of the members 31. As will be noted from FIG. 7, the ram is under the control of a three way valve 37 connected to the hydraulic lines 25 and 26 by branch lines 25A and 26A, respectively, with lines 38 and 39 effecting communication in a conventional manner with opposite ends of the ram cylinder 27.

Figure 2:
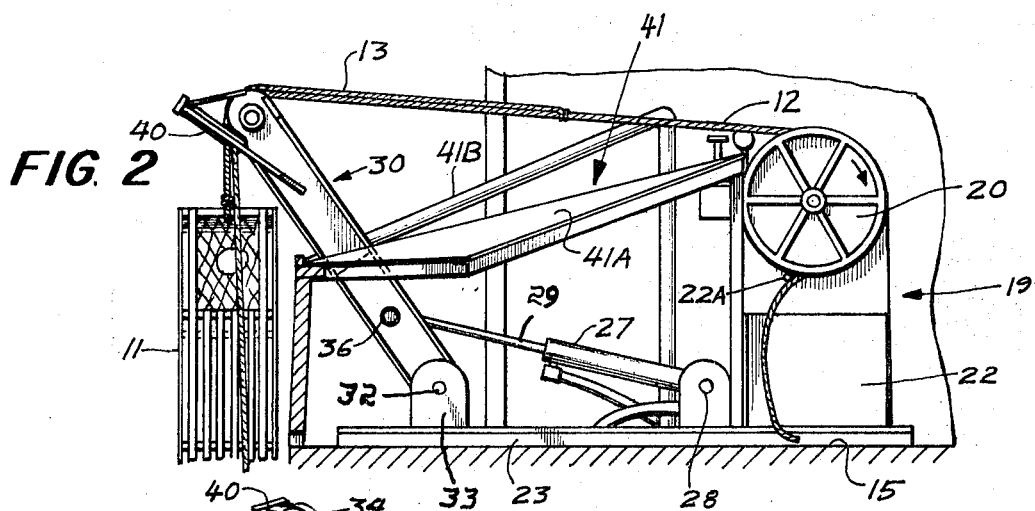
FIG. 2 is a section, taken on an increase in scale approximately along the indicated line 2—2 of FIG. 1.
Figure 3:
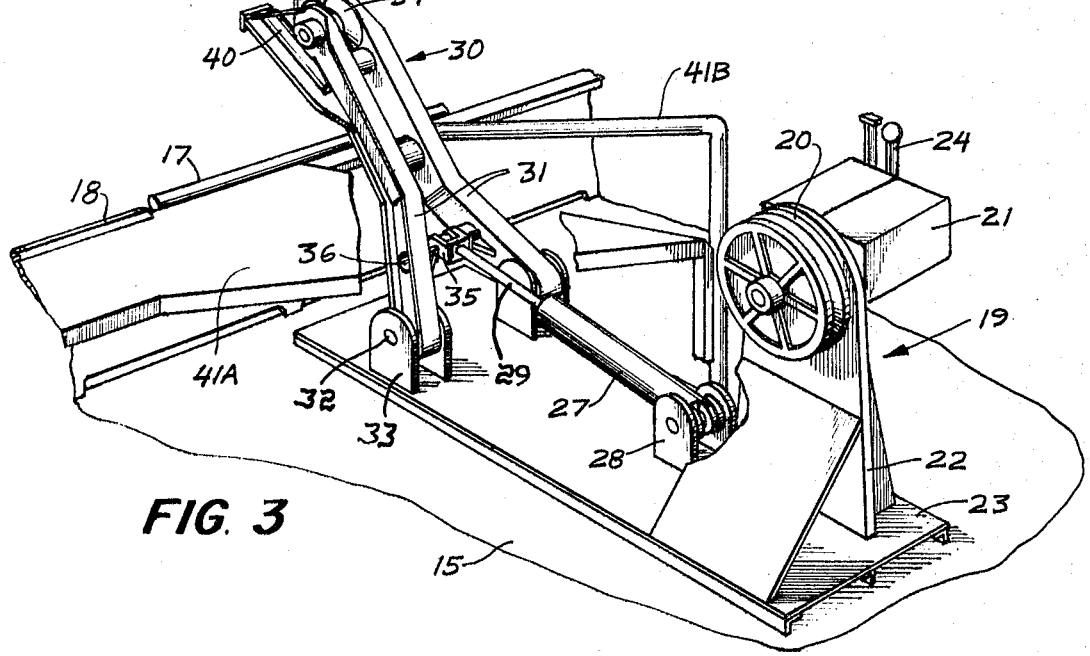
FIG. 3 is a perspective view of the aft side of the trap hauler.
Figure 4:
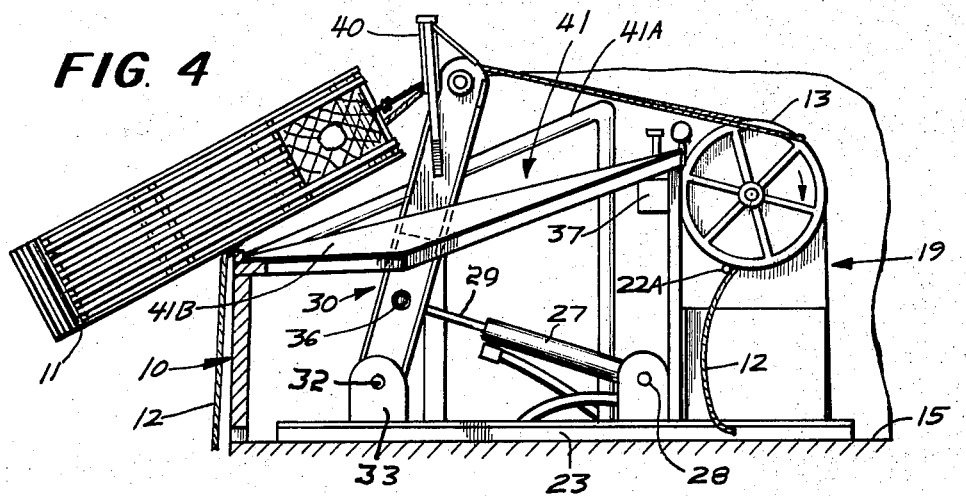
FIG. 4 is a view similar to FIG. 2 but with the lifting arm swung inwardly with the trap being drawn inboard over the rail.
Figure 5:
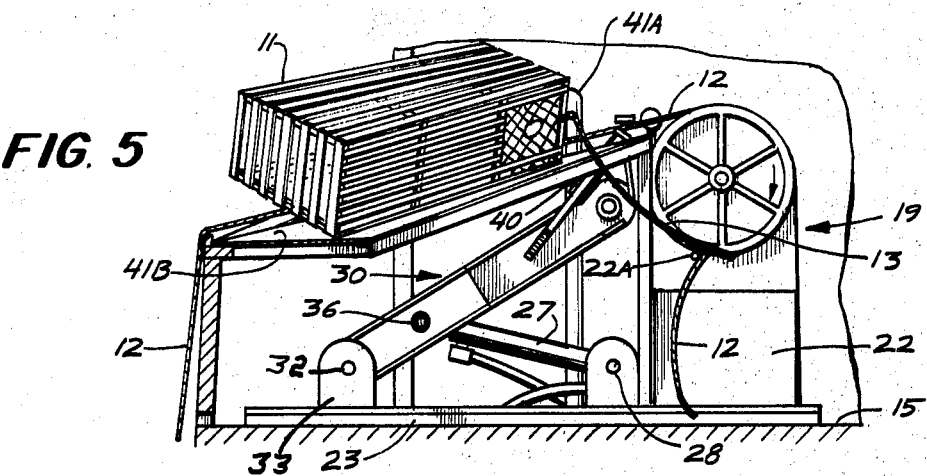
FIG. 5 is a like view but with the trap resting on the platform in a position to move aft.
Figure 6:
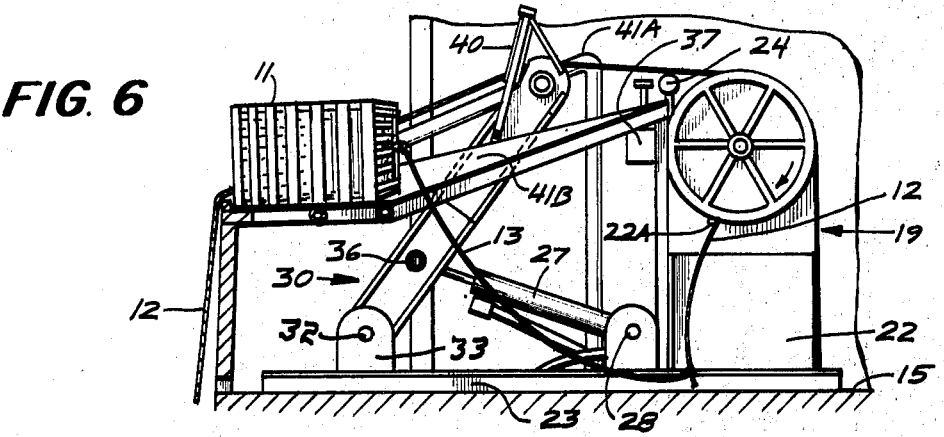
FIG. 6 is another like view with the trap now positioned on the platform to be unloaded, rebaited, and transferred to the platform from which it is to be subsequently launched.

The lifting arm 30 may, accordingly, be swung into an outboard position, see FIGS. 1, 2, and 3, in which it projects beyond the rail protecting member 17 and then into an inboard position, see FIG. 5, in which its sheave 33 is close to the hauling sheave 30 but below a flat plane tangent to the roller 17 and the upper portion of the sheave 20.

When the traps 11 attached to the line 12 are to be hauled, the line buoy, not shown, is picked up and the line 12 is passed over the sheave 33 and part way around the sheave 20 which is now turning in a line-hauling direction. The lifting arm 30, if not already in its outboard position is now so placed to ensure that when a trap 11 is brought to the surface it will be lifted free of the hull. It will be noted that each arm member 31 has a roller 40 inclined forwardly away from the sheave 33 to be engageable by a trap 11 being hauled inboard. In practice, when a trap 11 has been lifted from the water, see FIG. 2, the valve 37 is operated to swing the arm 30 towards the sheave 20 at about the same rate as the line 12 is being hauled.

As a trap 11 is thus hauled inboard, it lands on a ramp, generally indicated at 41 and consisting of sections 41A and 41B that are spaced apart to define a path for the lifting arm 30 that is narrower than the traps. The section 41A is upwardly inclined forwardly from the plane of the rack 16 and upwardly and inwardly inclined from the adjacent side of the ship 10 with its upper extremity close to the upper part of the sheave 20 and above the position of the sheave 33 when the lifting arm 30 has been swung inwardly to the maximum extent. This position is shown in FIG. 5 and it will be noted that the rollers 40 are partially exposed above the ramp section 41A for engagement by the hauled trap and to confine the line 11 between them. The ramp section 41B is inwardly and upwardly inclined to provide a somewhat steeper slope than the proximate edge of the ramp section 41A. The section 41B may conveniently be a length of pipe so bent that one end can be anchored to the plate 23 and its other end secured to the side of the boat.

Referring again to the trap 11 that has been lifted inboard, it will be noted that since its attaching line 13 is secured to a corner of the trap, the length of the trap is diagonal to the line 11 with the opposite leading corner riding on the ramp section 41B and the proximate side riding on the ramp section 41A. As the lifting arm 30 approaches its extreme inboard position, the lines 12 and 13 are free of the sheave 33.

The line 12 is still positioned above and between the rollers 40 but the line 13, because of its position of attachment to the trap 11 is then free and is pulled away from the path of the line 12 so that it lays on the aft side of the sheave 20 with the trap 11 free to slide aft onto the rack 16. While the traps so slide most of the time, some may remain on the ramp 41 but are easily pulled therefrom by a person servicing the traps. It will be appreciated that the ship's rail 18 prevents traps sliding down the ramp 41 from going overboard.

Once a hauled trap 11 has passed from the ramp 41 to the rack 16, the operator returns the lifting arm 30 to its outboard position with the line 12 again becoming trained over its sheave 33.

I claim:

1. Apparatus for use in hauling lobster traps and the like into a boat, said apparatus comprising a landing ramp extending from the position from which the trap line is to be pulled to the side of the boat over which hauled-in traps are to be lifted, said ramp including fore and aft sections spaced apart to provide an athwartship pathway that is narrower than the trap, a lifting arm pivotally mounted below the ramp to swing lengthwise of the pathway between first and second positions, said arm including a sheave at its free end over which the trap line is trained and which in said first arm position is outboard and in said second arm position is adjacent said pulling position, and power operated means below said ramp and connected to said arm and operable to swing said arm between said positions, to disengage its sheave from the trap line, said sheave, when said arm is in its second position, being disengaged from said trap line, the travel of said arm from its front to its second position being such as to lift a trap inboard and onto said ramp.

2. The apparatus of claim 1 in which said arm in said second position is below the ramp.

3. The apparatus of claim 1 in which the ramp is downwardly inclined towards the stern.

4. The apparatus of claim 1 and a trap hauler at said line-pulling position disposed with the groove of its sheave in a vertical plane inclusive of the pathway and the ramp is upwardly and inwardly inclined from the named side of the boat towards the upper portion of the sheave of the hauler and also downwardly inclined towards the stern.

5. The apparatus of claim 2 in which the lifting arm has a line guide upwardly exposed adjacent its free end in the second position of said arm.

6. The apparatus of claim 4 for use where there are a plurality of traps each having an off-center attaching line and a main line to which the attaching lines are connected in spaced relation and the upward and inward inclination of the ramp is such that the attaching line of a trap lifted onto the ramp is positioned to avoid being captured by the sheave of the hauler as the trap is pulled up the ramp.

7. The apparatus of claim 6 in which said arm is below the ramp in its second position.

8. The apparatus of claim 7 in which the sheave of the lifting arm is also below the ramp in said second position.

9. The apparatus of claim 8 in which the lifting arm includes a pair of line guides disposed adjacent its free end to project upwardly adjacent the hauler sheave in said second position.

10. The apparatus of claim 9 in which the line guides are rollers with their axes parallel and extending upwardly and inclined towards the hauler sheave in said second position, said rollers being engageable by a trap as it is hauled upwardly along the ramp.

11. The apparatus of claim 6 in which the fore section of the ramp defines a steeper slope than the aft section thereof.

* * * * *